US011347048B2

(12) United States Patent
Tohara et al.

(10) Patent No.: US 11,347,048 B2
(45) Date of Patent: May 31, 2022

(54) IMAGE DISPLAY DEVICE AND EYEPIECE OPTICAL SYSTEM

(71) Applicant: CANON KABUSHIKI KAISHA, Tokyo (JP)

(72) Inventors: Masakazu Tohara, Komae (JP); Ryoji Kondo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 222 days.

(21) Appl. No.: 16/690,953

(22) Filed: Nov. 21, 2019

(65) Prior Publication Data

US 2020/0192079 A1 Jun. 18, 2020

(30) Foreign Application Priority Data

Dec. 14, 2018 (JP) .............................. JP2018-234302

(51) Int. Cl.
*G02B 25/00* (2006.01)
*G02B 27/01* (2006.01)

(52) U.S. Cl.
CPC ....... *G02B 25/001* (2013.01); *G02B 27/0172* (2013.01); *G02B 2027/0127* (2013.01)

(58) Field of Classification Search
CPC .............. G02B 25/001; G02B 27/0172; G02B 2027/0127
USPC ........................... 359/630, 643, 648; 345/7–9
See application file for complete search history.

(56) References Cited

U.S. PATENT DOCUMENTS

| 6,519,090 | B2 * | 2/2003 | Endo .................... G02B 5/3016 349/11 |
| 7,468,843 | B2 | 12/2008 | Tanijiri et al. |
| 8,643,957 | B2 * | 2/2014 | Chen .................. G02B 13/0045 359/713 |
| 9,104,019 | B2 | 8/2015 | Okano |
| 9,995,939 | B2 | 6/2018 | Fun et al. |
| 10,018,845 | B2 | 7/2018 | Li et al. |
| 2014/0347739 | A1* | 11/2014 | Okano ................. G02B 25/001 359/646 |
| 2020/0158953 | A1 | 5/2020 | Tohara et al. |

FOREIGN PATENT DOCUMENTS

| JP | H07175009 A | 7/1995 |
| JP | 2004163858 A | 6/2004 |
| JP | 2014228716 A | 12/2014 |
| JP | 2018508800 A | 3/2018 |
| JP | 2018513392 A | 5/2018 |

* cited by examiner

*Primary Examiner* — William Choi
(74) *Attorney, Agent, or Firm* — Carter, DeLuca & Farrell LLP

(57) ABSTRACT provided is an image display device that can reduce deterioration in image quality in a peripheral portion of an eyepiece optical system, includes an eyepiece optical system having a polarization element and guiding light from an image display element toward eyeballs of an observer, in which the eyepiece optical system includes a first lens for determining an emission angle from the image display element, and a surface of the first lens on the image display element side has an aspherical shape having a convex shape in a region including an optical axis of the first lens, wherein the aspherical shape has an inflection point within an optically effective region in a cross section including the optical axis, and wherein an eye relief E of the eyepiece optical system satisfies 15 mm≤E≤25 mm.

18 Claims, 13 Drawing Sheets

101

IMAGE DISPLAY DEVICE AND EYEPIECE OPTICAL SYSTEM

BACKGROUND OF THE INVENTION

Field of the Invention

The present invention relates to an image display device and an eyepiece optical system.

Description of the Related Art

Development of head-mounted displays is underway, for example, for the purpose of virtual reality (VR) or enabling an observer to immerse oneself into an observed image on a large screen alone. For an image display device that is used for a head-mounted display (HMD) or the like, presentation of an image with a wide angle of view is desired in order to allow natural observation and increase a sense of presence. Further, it is preferable for a head-mounted image display device to have a small thickness and weight.

An eyepiece optical system that folds an optical path using polarization has been proposed as a technology for achieving presentation of an image with a wide angle of view. If an eyepiece optical system having a wide angle of view is realized using this polarization, a focal length of the eyepiece optical system is shortened. Accordingly, an emission angle from an image display element at a peripheral angle of view increases. If the emission angle from the image display element increases, field-of-view angle characteristics of the image display element deteriorates and an image with correct color cannot be observed. Further, an incidence angle of a polarization element such as a polarization plate, a λ/4 plate, and a polarizing beam splitter (PBS) in the eyepiece optical system also increases, and polarization characteristics deteriorate, causing a reduced amount of light, uneven amount of light, uneven color, and the like.

Examples of the eyepiece optical systems that fold optical paths using polarization are disclosed in Japanese Patent Laid-Open No. 07-175009 and Japanese Unexamined Patent Application Publication No. 2018-508800, both of which disclose a unit configured to realize an eyepiece optical system with a wide angle of view using polarization. In Japanese Patent Laid-Open No. 07-175009, a position of a center of curvature of a semi-transmissive reflective surface in the eyepiece optical system is defined in order to reduce optical aberration. In Japanese Patent Laid-Open No. 2018-508800, a wide angle of view is realized by using a polarization element on a curved surface.

In the eyepiece optical systems described in the above two patent documents, although an angle of view is wide, a focal length of the eyepiece optical system is long since the image display element is large. Therefore, an emission angle from the image display element at a peripheral angle of view is small so that the field-of-view angle characteristics of the image display element deteriorate does not occur. However, the focal length of the eyepiece optical system is long so that only a large image display element can be used. This leads to an increase in size or costs of the image display device.

An object of an aspect of the present invention is to provide an image display device that is advantageous, for example, in reducing deterioration in image quality in a peripheral portion of an eyepiece optical system with a wide angle of view using polarization, without an increase in a size of the eyepiece optical system.

SUMMARY OF THE INVENTION

In order to solve the above problems, an image display device according to an aspect of the present invention includes an eyepiece optical system, the eyepiece optical system including a polarization element and guiding light from an image display element toward eyeballs of an observer, wherein the eyepiece optical system includes a first lens for determining an emission angle from the image display element, and a surface of the first lens on the image display element side has an aspherical shape having a convex shape in a region including an optical axis of the first lens, wherein the aspherical shape has an inflection point within an optically effective region in a cross section including the optical axis, and wherein an eye relief E of the eyepiece optical system satisfies 15 mm≤E≤25 mm.

Further features of the present invention will become apparent from the following description of exemplary embodiments with reference to the attached drawings.

DESCRIPTION OF THE EMBODIMENTS

Figure 1:
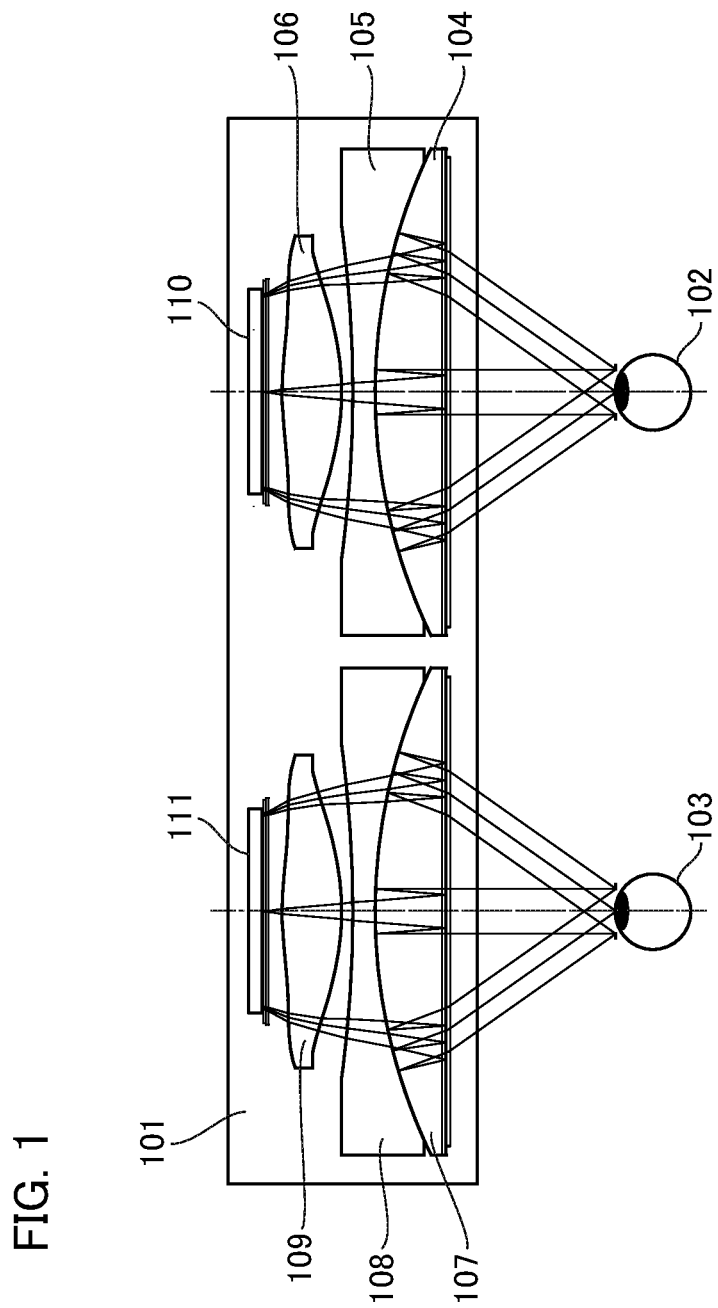
FIG. 1 is a schematic view of an image display device according to a first exemplary embodiment.

Hereinafter, exemplary embodiments of the present invention will be described in detail with reference to the drawings. In the drawings, the same members are denoted by the same reference numerals, and repeated description thereof will be omitted.

First Exemplary Embodiment

A configuration of an image display device according to a first exemplary embodiment will be described with reference to an eyepiece optical system of the image display device in FIG. 1. FIG. 1 is a schematic diagram of the image display device according to the first exemplary embodiment. In FIG. 1, 101 denotes an HMD as an image display device, 102 denotes a right eye of an observer, and 103 denotes a left eye of the observer. A lens 104, a lens 105, and a lens 106 constitute a right-eye eyepiece optical system, and a lens 107, a lens 108, and a lens 109 constitute a left-eye eyepiece optical system. 110 denotes a right-eye image display element, 111 denotes a left-eye image display element, and the image display elements are organic EL (Electroluminescence) displays.

The right-eye eyepiece optical system magnifies and projects an original image displayed on the right-eye image display element 110 as a virtual image and guides the image to the right eye 102 of the observer. The left-eye eyepiece optical system magnifies and projects an original image displayed on the left-eye image display element 111 as a virtual image and guides the image to the left eye 103 of the observer. In the first exemplary embodiment, as an example, a focal length F1 of the right-eye eyepiece optical system and the left-eye eyepiece optical system is 13 mm, a horizontal display angle-of-view is 63°, a vertical display angle-of-view is 33°, a diagonal display angle-of-view is 70°, and a distance (eye relief) E1 between the HMD 101 and an eyeball of the observer is 15 mm.

The eyepiece optical system of the first exemplary embodiment is an optical system that includes a polarization element and folds an optical path using polarization. In this specification, the polarization element refers to an optical element of which optical functions are switched according to a polarization direction of light, which includes, for example, a wavelength plate (a phase difference applying member) such as a λ/4 wavelength plate or a λ/2 wavelength plate, or a polarization plate such as a reflective polarization plate or a transmissive polarization plate. Further, the polarization element includes an optical element having a polarization function, included in a liquid crystal display element or the like.

Figure 2:
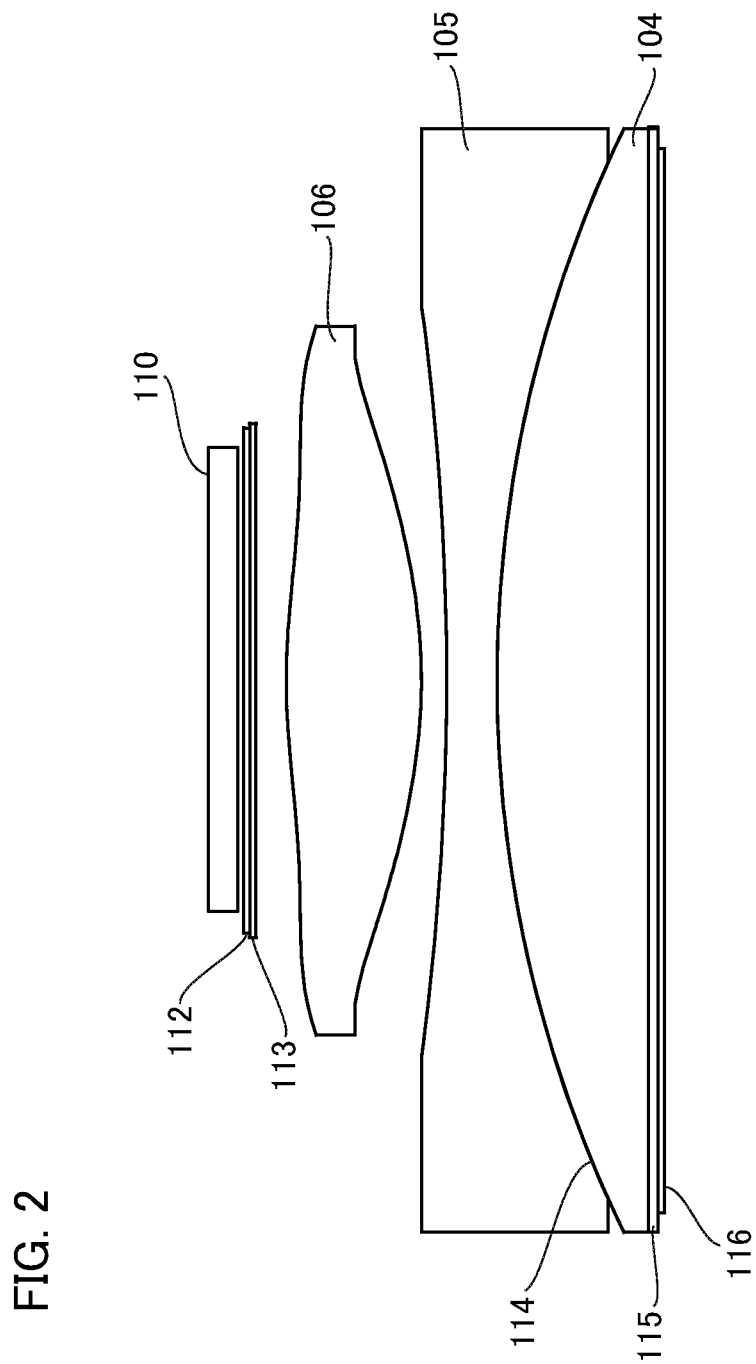
FIG. 2 is a diagram illustrating details of an eyepiece optical system according to the first exemplary embodiment.

An optical path of the eyepiece optical system of the first exemplary embodiment in the right-eye eyepiece optical system will be described. FIG. 2 is a diagram illustrating details of the eyepiece optical system according to the first exemplary embodiment. The eyepiece optical system according to the first exemplary embodiment includes at least one lens. First, as illustrated in FIG. 2, a polarization plate 112 and a λ/4 plate 113 are disposed in this order from the right-eye image display element 110 side between the right-eye image display element 110 and the lens 106, and a half mirror 114 is deposited on a surface of the lens 104 on the lens 105 side. The surface on which the half mirror 114 is deposited functions as a semi-transmissive reflective surface. Further, a λ/4 plate 115 and a PBS (polarizing beam splitter) 116 as a reflective polarization plate are formed in this order from the right-eye image display element 110 side between the lens 104 and the right eye 102 of the observer.

In this case, a slow axis of the λ/4 plate 113 and a slow axis of the λ/4 plate 115 are orthogonal to each other. Therefore, if a polarization direction in transmission through the polarization plate 112 and the slow axis of the λ/4 plate 113 are tilted by 45°, a polarization direction in transmission through the polarization plate 112 and the slow axis of the λ/4 plate 115 are tilted by −45°. Further, the polarization direction in transmission through the polarization plate 112 is orthogonal to a polarization direction in transmission through the PBS 116. Here, the slow axis tilted by 45° or tilted by −45° may be the slow axis substantially tilted by 45° or −45°. For example, an absolute value may be 40° or more and 50° or less and, more preferably, 43° or more and 47° or less. Further, for positive and negative tilts, the positive tilt is a clockwise direction and the negative tilt is a counterclockwise direction. Further, the same 45° to be described below is also interpreted as having the similar range mentioned above.

In the case of such a configuration, light emitted from the right-eye image display element 110 is transmitted through the polarization plate 112 to become linearly polarized light, and is transmitted through the λ/4 plate 113 to become circularly polarized light. The circularly polarized light is transmitted through the half mirror 114 and is transmitted through the λ/4 plate 115 to become linearly polarized light. However, since a polarization direction of the linearly polarized light is orthogonal to the polarization direction in transmission through the PBS 116, the light is reflected by the PBS 116 and transmitted through the λ/4 plate 115 to become circularly polarized light. The light is reflected by the half mirror 114 and transmitted through the λ/4 plate 115 to become linearly polarized light, but a polarization direction of this linearly polarized light is different from a previous one and matches the polarization direction in transmission through the PBS 116. Accordingly, the linearly polarized light is transmitted through the PBS 116 and guided to the right eye 102 of the observer. The same optical path applies to the left-eye eyepiece optical system.

With the optical system that folds the optical path using polarization as in the first exemplary embodiment, the thickness of the eyepiece optical system can be reduced, the focal length of the eyepiece optical system can be shortened, and wide angle-of-view image observation can be realized.

Figure 3:
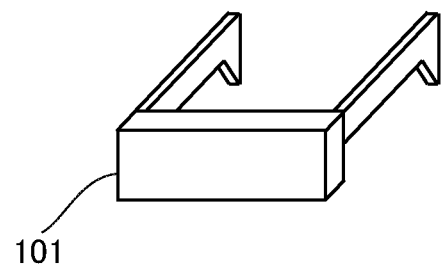
FIG. 3 is an external view of an HMD.

FIG. 3 is an external view of the HMD 101. Since the HMD 101 is a head-mounted image display device, it is preferable for the HMD 101 to be lightweight. Therefore, it is preferable for the lenses constituting the eyepiece optical system to be made of a resin having a specific gravity smaller than that of glass, and the lens 106 and the lens 109 of the first exemplary embodiment are resin lenses and are aspherical lenses to enhance an aberration correction effect.

Figure 4:
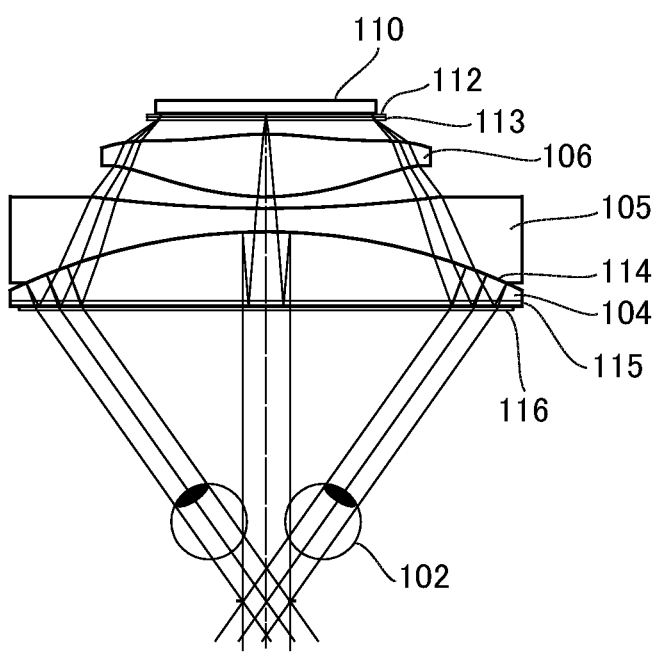
FIG. 4 is a view illustrating details of the eyepiece optical system according to the first exemplary embodiment.

FIG. 4 is a diagram illustrating details of the eyepiece optical system according to the first exemplary embodiment. As illustrated in FIG. 4, an exit pupil of the eyepiece optical system of the first exemplary embodiment is at a position of 25 mm, which is an eye relief of 15 mm plus a rotation radius of an eyeball of 10 mm, and an exit pupil diameter is 4 mm. Thus, even if the eyeballs rotate to observe the top, bottom, left and right, light in such a direction is incident on the eyeballs. The HMD is a head-mounted image display device, and it is preferable for an eye relief E1 to be 15 mm or more so that an observer wearing spectacles can wear the HMD. Further, if the eye relief becomes long, an outer shape of the lens becomes large and the HMD also becomes large. Therefore, it is preferable for the eye relief E1 to be 25 mm or less. That is, it is preferable to satisfy 15 mm≤E≤25 mm. Here, the eye relief E1 described in the first exemplary embodiment and eye reliefs E2 and E3 to be described below correspond to the above-described eye relief E, thereby satisfying the conditional equation described above.

Here, a thickness L1 of the right-eye eyepiece optical system is defined as a distance from a surface of the PBS 116 of the right-eye eyepiece optical system on the right eye of the observer 102 side to a surface of the right-eye image display element 110 on the polarization plate 112 side.

And the thickness L1 in the first exemplary embodiment is 17 mm. Since the eye relief E1 is 15 mm as described above, a ratio L1/E1 between the thickness L1 and the eye relief E1 is 1.1. It is preferable for this value to satisfy 0.6 or more and 1.3 or less, that is, $0.6 \leq L/E \leq 1.3$ in order to achieve both long eye relief and an eyepiece optical system with a small thickness. Here, the thickness L1 described in the first exemplary embodiment and thicknesses L2 and L3 to be described below correspond to the thickness L described above, and the eye relief E1 and eye reliefs E2 and E3 to be described below correspond to the eye relief E described above, thereby satisfying the conditional equation described above.

If a value of L/E is smaller than 0.6, the eye relief becomes long, the outer shape of the lens becomes large, and the HMD also becomes large. Further, if the value of L/E is greater than 1.3, the eyepiece optical system becomes thick and the HMD becomes large or the eye relief becomes short so that the observer has a feeling of oppression, or an observer wearing glasses cannot wear the HMD. The value of L/E is more preferably 0.7 or more and 1.0 or less, that is, may satisfy $0.7 \leq L/E \leq 1.0$.

Optical data of the eyepiece optical system of the first exemplary embodiment is shown in Table 1. In Table 1, SURF is a surface number, d is an interval, R is a radius of a curvature, typ is a surface shape, Nd is a refractive index, vd is an Abbe number, SPH of typ indicates that the surface shape is a spherical surface shape, and ASP1 indicates that the surface shape is an aspherical shape. In the surface number, an exit pupil position is surface 1, and backward ray tracing, which is to form an image onto an image display element surface from a virtual image position, is shown.

TABLE 1

| SURF | d | R | typ | Nd | vd |
|---|---|---|---|---|---|
| Virtual image surface | −14.00 | | | | |
| 1 | 10.00 | | | | |
| 2 | 15.00 | | | | |
| 3 | 0.25 | ∞ | SPH | 1.516 | 64.1 |
| 4 | 0.25 | ∞ | SPH | 1.516 | 64.1 |
| 5 | 6.02 | ∞ | SPH | 1.690 | 49.8 |
| 6 | −6.02 | −50.40 | SPH | 1.690 | 49.8 |
| 7 | −0.25 | ∞ | SPH | 1.516 | 64.1 |
| 8 | 0.25 | ∞ | SPH | 1.516 | 64.1 |
| 9 | 6.02 | ∞ | SPH | 1.690 | 49.8 |
| 10 | 2.00 | −50.40 | SPH | 1.755 | 27.6 |
| 11 | 1.00 | 75.19 | SPH | | |
| 12 | 5.36 | 22.01 | ASP1 | 1.744 | 44.9 |
| 13 | 1.20 | −26.09 | ASP1 | | |
| 14 | 0.25 | ∞ | SPH | 1.516 | 64.1 |
| 15 | 0.25 | ∞ | SPH | 1.516 | 64.1 |
| 16 | 0.10 | ∞ | SPH | | |
| Image display element surface | | | | | |

A surface shape ASP1 is a rotationally symmetric aspherical surface of which a sag amount z is according to the following equation.

$$ASP1: z = \frac{cr^2}{1 + \sqrt{1-c^2r^2}} + Ar^4 + Br^6 + Cr^8 \quad \text{[Math. 1]}$$

In the above equation, r is a distance from the optical axis. Further, c is 1/R. A, B and C are aspherical coefficients.

Aspherical coefficients A to C of surface numbers 12 and 13 are as shown in Table 2.

TABLE 2

| SURF | A | B | C |
|---|---|---|---|
| 12 | −7.30E−05 | 4.60E−07 | −2.13E−09 |
| 13 | 2.54E−04 | −1.33E−06 | 2.10E−09 |

In a case where the eye relief is long, the focal length is small, and the thickness is small as in the eyepiece optical system of the first exemplary embodiment, the emission angle from the image display element at a peripheral angle of view becomes large. And in a case where the emission angle from the image display element is large, the field-of-view angle characteristics deteriorate and an image with correct color cannot be observed. Further, an incidence angle of the polarization element of the polarization plate or the λ/4 plate in the eyepiece optical system increases and polarization characteristics deteriorate, causing a reduced amount of light, uneven amount of light, uneven color, and the like. Therefore, it is preferable for the emission angle from the image display element at the peripheral angle of view to be small, and in the eyepiece optical system of the first exemplary embodiment, an emission angle of a main ray at a maximum peripheral view angle from the image display element is 48°.

The eye relief E1 of the eyepiece optical system of the first exemplary embodiment is 15 mm and a maximum half angle of view θ1 is 35°. In this case, E1×tan θ1=10.5 mm, and it is preferable for this value to be 8 mm or more and 20 mm or less, that is, 8 mm $\leq$ E×tan θ $\leq$ 20 mm be satisfied in order to achieve both the length of the eye relief and the wide angle of view of the eyepiece optical system. Here, the eye relief E1 described in the first exemplary embodiment and eye reliefs E2 and E3 to be described below correspond to the eye relief E described above, and tan θ1, and tan θ2 and tan θ3 to be described below correspond to tan θ described above, thereby satisfying the conditional equation described above.

If a value of E×tan θ is smaller than 8 mm, the eye relief becomes short, a feeling of oppression is given to the observer, an observer wearing glasses cannot wear the HMD, or the angle of view of the eyepiece optical system is narrow and natural observation with a sense of presence cannot be obtained. Further, if this value is greater than 20 mm, the eye relief is long and the outer shape of the lens becomes large, and the HMD also becomes large, or the angle of view is too wide and the emission angle from the image display element at the peripheral angle of view becomes large and field-of-view angle characteristics deteriorate. A value of E1×tan θ1 is more preferably 12 mm or more and 18 mm or less, that is, it is preferable for 12 mm $\leq$ E×tan θ $\leq$ 18 mm to be satisfied.

Figure 5:
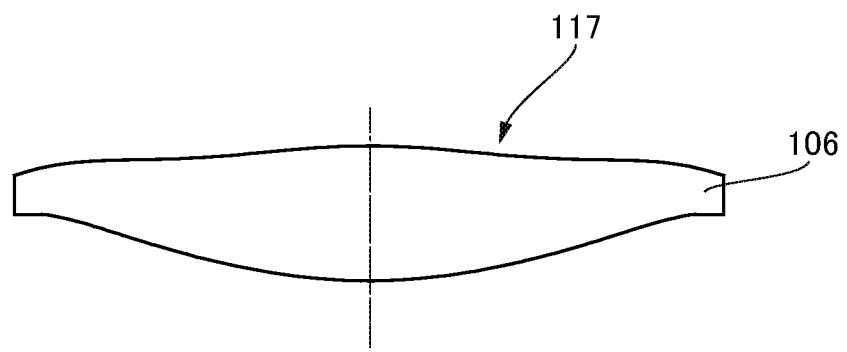
FIG. 5 is a cross-sectional view of a lens 106 in a plane including an optical axis.

In the first exemplary embodiment, an aspherical shape of the lens 106 on the image display element side is a shape as illustrated in FIG. 5, in order to reduce the emission angle from the image display element at a peripheral angle of view. FIG. 5 is a sectional view of the lens 106 in a plane in an optical axis direction including an optical axis. The lens 106 is a lens for determining the emission angle of the right-eye image display element 110. The lens 106 is disposed at a position closest to the right-eye image display element 110 among at least one lens included in the right-eye eyepiece optical system. If a lens array, a lenticular lens, or the like is disposed on or near a surface of the image display element, it is assumed that the lens array, the lenticular lens, or the like is included in the image display element and is not included in the eyepiece optical system. The same applies to the following exemplary embodiments.

A surface of the lens 106 on the right-eye image display element 110 side is convex toward the right-eye image display element 110 in a region including the optical axis, but has a curvature that becomes more gentle as a distance from the optical axis increases, and has an inflection point 117 in an optically effective region that is a region through which effective rays pass. The inflection point referred to herein refers to a point at which a curve changes between an upwardly convex state and an upwardly concave state. In other words, the inflection point is a point at which a value obtained by differentiating a curve indicating the surface of the lens 106 on the right-eye image display element 110 side in a cross section in the optical axis direction including the optical axis of the lens 106 twice becomes zero.

In the first exemplary embodiment, the focal length of the eyepiece optical system is shortened by setting the region including the optical axis in the surface of the lens 106 on the right-eye image display element 110 side to a convex shape. By making the curvature gentler as the distance from the optical axis increases, the emission angle from the image display element in the peripheral portion can be reduced. The same applies to the lens 109 that is a lens corresponding to the lens 106 in the left-eye eyepiece optical system.

It is possible to achieve an the eyepiece optical system with a wide angle of view in which a focal length is small due to such an aspherical shape, and it is possible to suppress deterioration of the field-of-view angle characteristics of the image display element and reduce color aberration by reducing the emission angle from the image display element at the peripheral angle of view. Further, it is possible to reduce image quality deterioration such as a reduced amount of light, an uneven amount of light, and an uneven color by reducing the incidence angle of the polarization plate or the λ/4 plate.

If the surface of the lens 106 on the image display element side is concave toward the right-eye image display element 110 in order to reduce the emission angle from the image display element at the peripheral angle of view, an optical power is negative. Accordingly, it is difficult to shorten the focal length of the eyepiece optical system. Therefore, if an image display element having the same size is used, a wide angle of view as in the first exemplary embodiment cannot be obtained, and if a larger image display element is used in order to obtain the same angle of view as in the first exemplary embodiment, the HMD becomes larger and heavier. According to the first exemplary embodiment, it is possible to realize a wide angle of view without increasing a size of the HMD.

Figure 6:
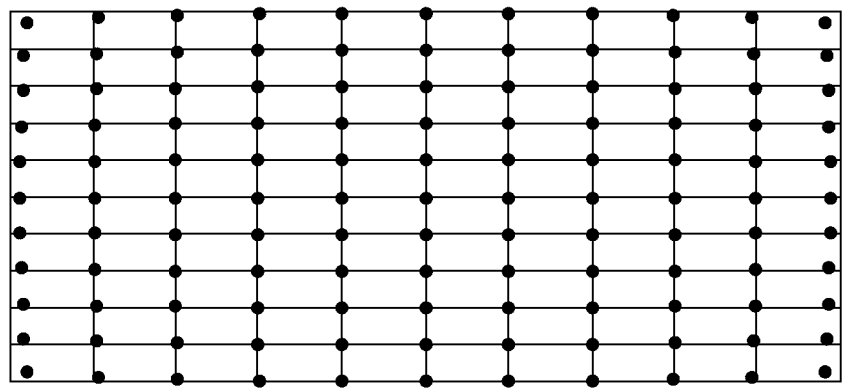
FIG. 6 is a diagram illustrating distortion in backward ray tracing of the eyepiece optical system according to the first exemplary embodiment.

FIG. 6 is a diagram illustrating distortion in backward ray tracing of the eyepiece optical system according to the first exemplary embodiment. In FIG. 6, actual image formation positions of intersections of ideal grid lines are indicated by black circles. As can be seen from FIG. 6, there is substantially no distortion near the optical axis, and distortion in a peripheral portion is also small. If the surface of the lens 106 on the right-eye image display element 110 side is concave toward the right-eye image display element 110, the focal length of the eyepiece optical system increases. In that case, since it is difficult to reduce distortion in a central portion and the peripheral portion with the same angle of view using an image display element having the same size as that of the first exemplary embodiment, discomfort increases during observation. In this case, the distortion at the time of observation may be reduced using a method of performing image processing on the image displayed on the image display element in order to cancel the distortion. However, if the distortion of the eyepiece optical system is large, a correction error of image processing becomes large and a load of image processing increases. Therefore, with the aspherical shape as in the first exemplary embodiment, it is possible to reduce the distortion and reduce discomfort at the time of observation.

The aspherical shape of the lens 106 on the image display element side has the inflection point 117 in order to achieve both a reduced emission angle from the image display element at the peripheral angle of view and a small focal length of the eyepiece optical system. A distance H1 of the inflection point 117 from the optical axis is about 4 mm, and a maximum distance R1 of the optically effective region of the surface of the lens 106 on the image display element side is 12 mm. Therefore, the distance from the optical axis to the inflection point 117 is at a position corresponding to 33% of the optically effective region. This distance is preferably 0.2 to 0.7 times a radius of the optically effective region, that is, $0.2 \leq H/R \leq 0.7$. Here, the distance H1 described in the first exemplary embodiment and distances H2 and H3 to be described below correspond to the distance H described above, and the maximum distance R1, and maximum distances R2 and R3 to be described below correspond to tan θ described above, thereby satisfying the conditional equation described above.

If a value of H/R is smaller than 0.2 times, the inflection point is close to the optical axis and optical power near the optical axis becomes low, such that the focal length of the eyepiece optical system cannot be shortened. Further, if the value of H/R is greater than 0.7 times, the inflection point reaches a peripheral portion of the optically effective region, and an effect of reduction in the emission angle from the image display element at the peripheral angle of view is degraded. The value of H/R is more preferably 0.3 to 0.7 times, that is, may satisfy $0.3 \leq H/R \leq 0.7$.

Further, the aspherical shape of the lens 106 on the image display element side is a shape that varies monotonously as a distance from the optical axis increases, and has no maximum value or minimum value at points other than a point on the optical axis in the optically effective region. Thereby, both the reduced emission angle from the image display element at the peripheral angle of view and the small focal length of the eyepiece optical system are achieved. Further, it is possible to make it easy for the image to be observed or improve manufacturing accuracy of the aspheric shape by reducing the change in the aspheric shape to reduce the change in optical performance from a center to a periphery of the image.

Since the focal length F1 of the eyepiece optical system of the first exemplary embodiment is 13 mm and the focal length f1 at the time of reflection of the semi-transmissive reflective surface of the lens 104 is 25 mm, f1/F1 is 1.9. In the case of an eyepiece optical system that folds the optical path using polarization, it is preferable for a ratio of the focal length F1 of the semi-transmissive reflective surface to the focal length f1 of the entire eyepiece optical system to be 1.6 or more and 1.9 or less, that is, satisfy $1.6 \leq f/F \leq 1.9$ in order to achieve both optical performance and a small thickness of the eyepiece optical system. Here, the focal length F1 described in the first exemplary embodiment and focal lengths F2 and F3 to be described below correspond to the focal length F described above, and the focal length f1 and focal lengths f2 and f3 to be described below correspond to the focal length f described above, thereby satisfying the conditional equation described above.

If a value of f/F is smaller than 1.6, a focal length of the semi-transmissive reflective surface is shorter than the focal length of the entire eyepiece optical system, it becomes difficult for an aberration on the semi-transmissive reflective surface to be cancelled out by other optical surfaces, and optical performance deteriorates. Further, a back focus between the lens and the image display element is shortened, and it is difficult to dispose a polarization plate or a λ/4 plate. Further, if this value is greater than 1.9, the focal length of the semi-transmissive reflective surface is long and the eyepiece optical system becomes thick. The value of the f/F value is more preferably 1.6 or more and 1.8 or less, that is, may satisfy $1.6 \leq f/F \leq 1.8$.

The various numerical values of the eyepiece optical system according to the first exemplary embodiment described above can be summarized as shown in Table 3 below.

TABLE 3

| | |
|---|---|
| H1/R1 | 0.33 |
| L1/E1 | 1.1 |
| E1 × tan θ1 | 10.5 |
| E1 | 15 |
| f1/F1 | 1.9 |

Figure 7:
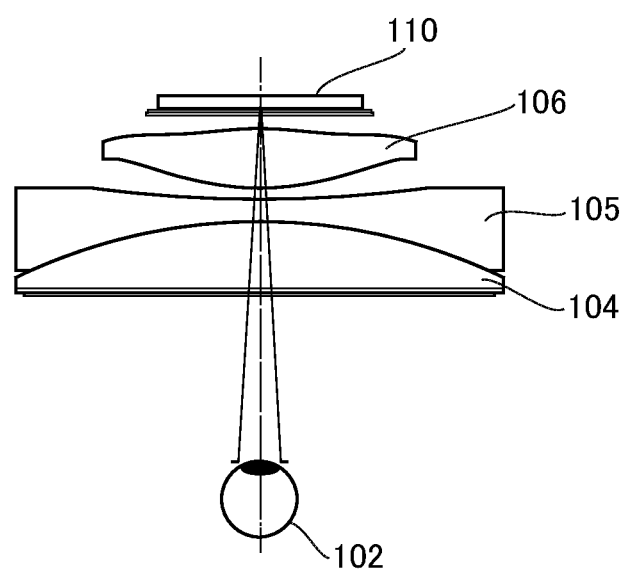
FIG. 7 is a view illustrating ghost light.

The lens 106 and the lens 109 of the first exemplary embodiment are resin lenses for weight reduction, but if a resin lens is manufactured by molding, birefringence occurs due to an influence of residual stress at the time of molding. In the case of an optical system using polarization as in the first exemplary embodiment, light use efficiency of a regular optical path described above is degraded due to the birefringence in the lens and a difference in light use efficiency between wavelengths also occurs. These cause a reduced amount of light, uneven amount of light, and uneven color of the observed image. Further, a proportion of light that is transmitted through the PBS 116 due to an influence of the birefringence in light to be reflected by the PBS 116 in the regular optical path increases, the light from the display element is directly guided to the eyes of the observer as in FIG. 7, and ghost light is generated. Therefore, it is necessary for the birefringence of the resin lens constituting the eyepiece optical system to be as small as possible.

In the first exemplary embodiment, glass lenses are adopted for the lenses 104, 105, 107, and 108 to reduce the birefringence. Since the birefringence of a glass lens is very small, high-quality image observation is enabled. The lens 104 and the lens 105 of the right-eye eyepiece optical system and the lens 107 and the lens 108 of the left-eye eyepiece optical system may be bonded to form an integrated lens. With a bonded lens, it is easier for the lens to be held.

Further, a polarization plate may be disposed between the PBS and the eyeball of the observer in order to reduce unnecessary ghost light and increase contrast in the observed image.

In the first exemplary embodiment, surfaces of the lens 104 of the right-eye eyepiece optical system and the lens 107 of the left-eye eyepiece optical system on the eyeball side of the observer are flat surfaces. Accordingly, it is possible to achieve both long eye relief and an optical system with a small thickness. If a shape of this surface is concave toward the eyeball of the observer, the lens becomes thick in order to ensure the eye relief in the peripheral portion. If the surface is convex, the lens becomes thick in order to ensure a thickness of a lens edge portion.

Further, although the PBS 116 is formed on a flat surface portion of the lens 104 in the first exemplary embodiment, the surface of the lens 104 on the right eye 102 side of the observer may be formed as a curved surface and the PBS 116 may be formed on the curved surface. Thereby, a degree of freedom in designing the lens 104 is improved, and an eyepiece optical system with better optical performance is obtained.

Although the image display element is an image display element that emits non-polarized light as an organic EL in the first exemplary embodiment, a liquid crystal display, for example, may be used as an image display element including a polarization element. By causing linearly polarized light to be emitted from the image display element, the polarization plate 112 on the image display element side is not necessary, and the thickness and costs may be reduced. The same applies to the following exemplary embodiments.

Although the right-eye eyepiece optical system has been mainly described by way of example in the first exemplary embodiment, it goes without saying that the present invention can also be applied to the left-eye eyepiece optical system. The same applies to the following exemplary embodiments.

Second Exemplary Embodiment

Figure 8:
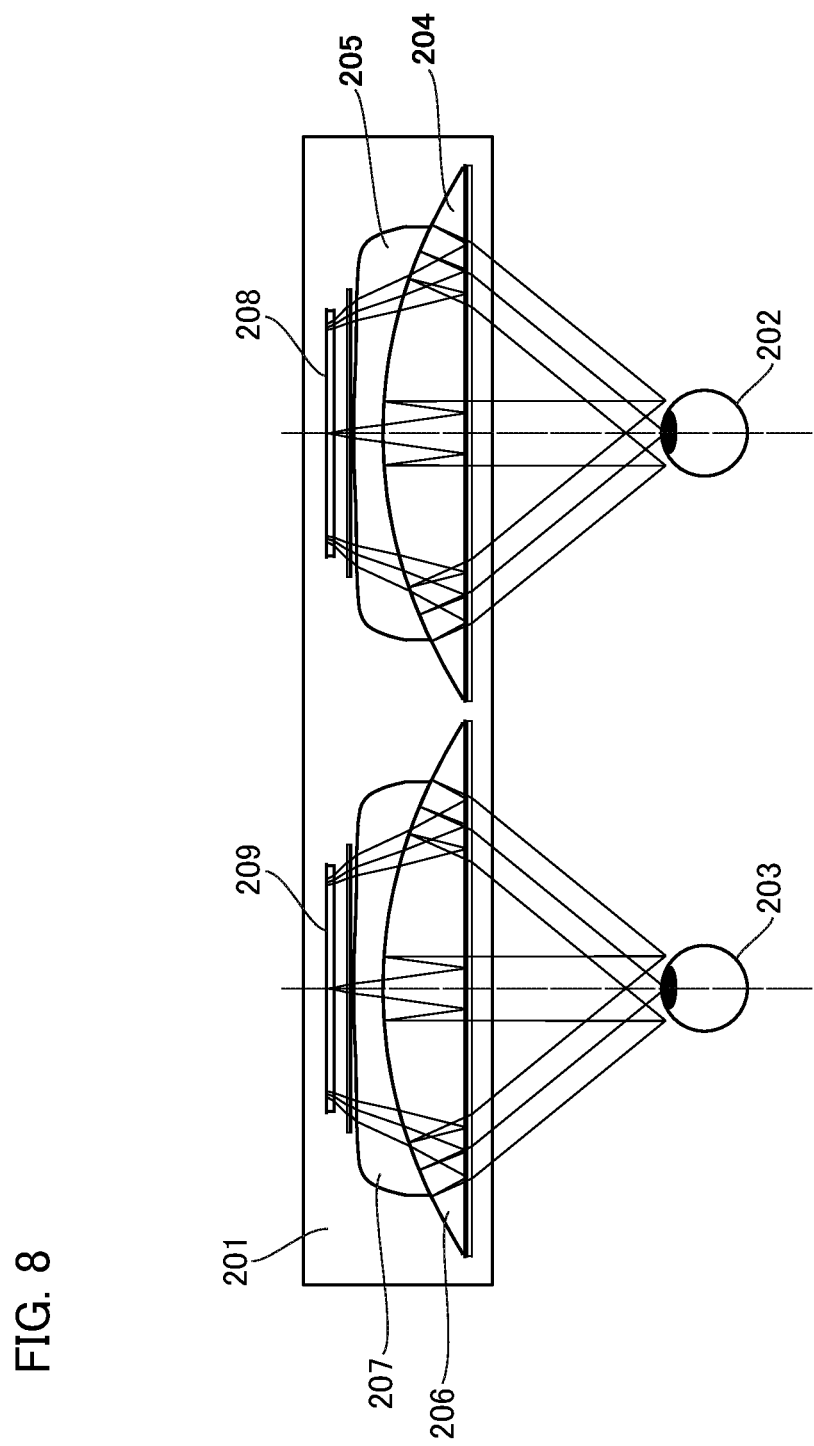
FIG. 8 is a schematic view of an image display device according to a second exemplary embodiment.

A configuration of an image display device according to a second exemplary embodiment will be described with reference to an eyepiece optical system of an image display device in FIG. 8. FIG. 8 is a schematic diagram of the image display device according to the second exemplary embodiment. In FIG. 8, 201 denotes an HMD, 202 denotes a right eye of an observer, and 203 denotes a left eye of the observer. A lens 204 and a lens 205 constitute a right-eye eyepiece optical system, and a lens 206 and a lens 207 constitute a left-eye eyepiece optical system. 208 denotes a right-eye image display element, 209 denotes a left-eye image display element, and these image display elements are organic EL displays.

The right-eye eyepiece optical system magnifies and projects an original image displayed on the right-eye image display element 208 as a virtual image and guides the image to the right eye 202 of the observer. The left-eye eyepiece optical system magnifies and projects an original image displayed on the left-eye image display element 209 as a virtual image and guides the image to the left eye 203 of the observer. In the second exemplary embodiment, as an example, a focal length F2 of the right-eye eyepiece optical system and the left-eye eyepiece optical system is 13 mm, a horizontal display angle-of-view is 60°, a vertical display angle-of-view is 60°, a diagonal display angle-of-view is 78°, and the eye relief E2 is 18 mm.

Figure 9:
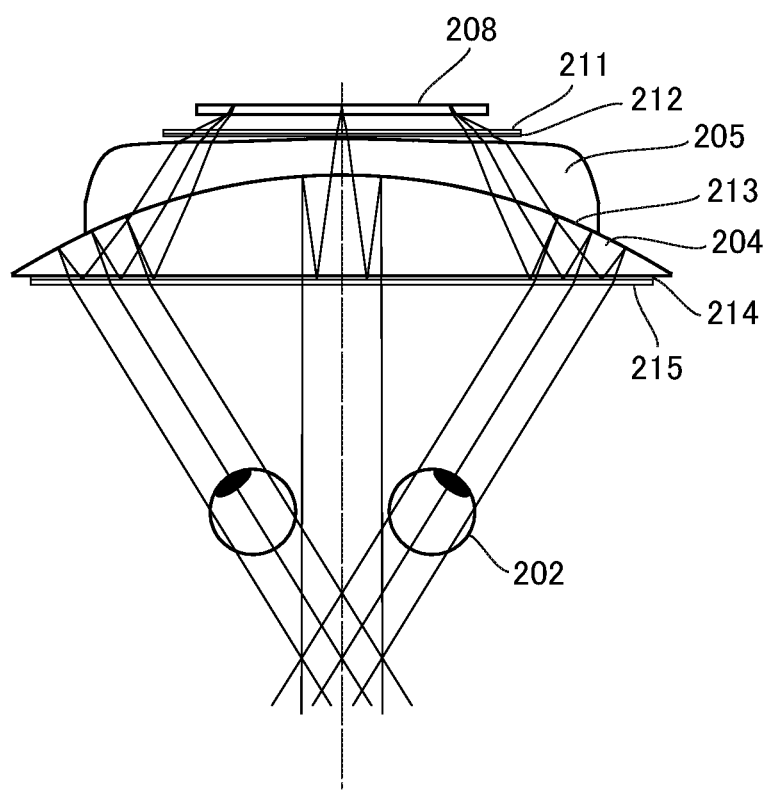
FIG. 9 is a diagram illustrating details of an eyepiece optical system according to the second exemplary embodiment.

The eyepiece optical system of the second exemplary embodiment is an optical system that includes a polarization element and folds an optical path using polarization. The optical path of the eyepiece optical system of the second exemplary embodiment in the right-eye eyepiece optical system will be described. FIG. 9 is a diagram illustrating details of the eyepiece optical system according to the second exemplary embodiment. The eyepiece optical system according to the second exemplary embodiment includes at least one lens. First, a polarization plate 211 and a λ/4 plate 212 are disposed in this order from the right-eye image display element 208 side between the right-eye image display element 208 and the lens 205, and a half mirror 213 is deposited on a surface of the lens 204 on the lens 205 side. The surface on which the half mirror 213 is deposited acts as a semi-transmissive reflective surface. Further, a λ/4 plate 214 and a PBS 215 of a reflective polarization plate are formed in this order from the right-eye image display element 208 side between the lens 204 and the right eye 202 of the observer.

In this case, a slow axis of the λ/4 plate 212 and a slow axis of the λ/4 plate 214 are orthogonal to each other. Therefore, if a polarization direction in transmission through the polarization plate 211 and the slow axis of the λ/4 plate 212 are tilted by 45°, a polarization direction in transmission through the polarization plate 211 and the slow axis of the λ/4 plate 214 are tilted by −45°. Further, the polarization direction in transmission through the polarization plate 211 is orthogonal to a polarization direction in transmission through the PBS 215.

In the case of such a configuration, light emitted from the right-eye image display element 208 is transmitted through the polarization plate 211 to become linearly polarized light, and is transmitted through the λ/4 plate 212 to become circularly polarized light. The circularly polarized light is transmitted through the half mirror 213 and the λ/4 plate 214 to become linearly polarized light. Since a polarization direction of the linearly polarized light is orthogonal to the polarization direction in transmission through the PBS 215, the light is reflected by the PBS 215 and transmitted through the λ/4 plate 215 to become circularly polarized light. The light is reflected by the half mirror 213 and transmitted through the λ/4 plate 215 to become linearly polarized light, but a polarization direction of this linearly polarized light is different from a previous one and matches the polarization direction in transmission through the PBS 215. Accordingly, the linearly polarized light is transmitted through the PBS 215 and guided to the right eye 202 of the observer. The same optical path applies to the left-eye eyepiece optical system.

With the optical system that folds the optical path using polarization as in the second exemplary embodiment, the thickness of the eyepiece optical system can be reduced, the focal length of the eyepiece optical system can be shortened, and wide angle-of-view image observation can be realized.

Since the HMD is a head-mounted image display device, it is preferable for the HMD to be lightweight. Therefore, it is preferable for the lenses constituting the eyepiece optical system to be made of a resin having a specific gravity smaller than that of glass, and the lenses 204, 205, 206, and 207 of the second exemplary embodiment are resin lenses and are aspherical lenses to enhance an aberration correction effect.

As illustrated in FIG. 9, an exit pupil of the eyepiece optical system of the second exemplary embodiment is at a position of 28 mm, which is eye relief of 18 mm plus a rotation radius of an eyeball of 10 mm, and an exit pupil diameter is 6 mm.

In a case where a thickness L2 of the right-eye eyepiece optical system is defined as a distance from a surface of the PBS 215 on the right eye 202 of the observer between the lens 204 and the right eye 202 of the observer to a surface of the right-eye image display element 208 on the polarization plate 211 side, the thickness L2 is 13.5 mm. Since the eye relief E2 is 18 mm as described above, a ratio L2/E2 between the thickness L2 and the eye relief E2 is 0.8.

Optical data of the eyepiece optical system of the second exemplary embodiment is shown in Table 3. ASP2 of typ means that the surface shape is an aspherical shape. In the surface number, an exit pupil position is surface 1, and backward ray tracing, which is to form an image onto an image display element surface from a virtual image position, is shown as in the first exemplary embodiment.

TABLE 4

| SURF | d | R | typ | Nd | vd |
|---|---|---|---|---|---|
| Virtual image surface | −1400 | | | | |
| 1 | 10.00 | | | | |
| 2 | 18.00 | | | | |
| 3 | 0.41 | ∞ | SPH | 1.500 | 64.1 |
| 4 | 0.28 | ∞ | SPH | 1.580 | 64.1 |
| 5 | 7.57 | ∞ | SPH | 1.544 | 56.1 |
| 6 | −7.57 | −42.53497 | ASP2 | 1.544 | 56.1 |
| 7 | −0.28 | ∞ | SPH | 1.580 | 64.1 |
| 8 | 0.28 | ∞ | SPH | 1.580 | 64.1 |
| 9 | 7.57 | ∞ | SPH | 1.544 | 56.1 |
| 10 | 2.72 | −43.53497 | ASP2 | 1.635 | 23.9 |
| 11 | 0.20 | −121.7993 | ASP2 | | |
| 12 | 0.20 | ∞ | SPH | 1.580 | 64.1 |
| 13 | 0.25 | ∞ | SPH | 1.500 | 64.1 |
| 14 | 1.20 | ∞ | SPH | | |
| 15 | 0.70 | ∞ | SPH | 1.516 | 64.1 |
| Image display element surface | | | | | |

A surface shape ASP2 is a rotationally symmetric aspherical surface of which a sag amount z is according to the following equation.

$$ASP2: z = \frac{cr^2}{1 + \sqrt{1 - c^2 r^2}} + Ar^4 + Br^6 + Cr^8 + Dr^{10} + Er^{12} \quad \text{[Math. 2]}$$

In the above equation, r is the distance from the optical axis. Further, c is 1/R. A, B, C, D and E are aspherical coefficients.

Aspherical coefficients of the surface numbers 6, 10, and 11 are as shown in Table 4.

TABLE 5

| SURF | A | B | C | D | E |
|---|---|---|---|---|---|
| 6 | −1.32E−06 | 1.02E−08 | −3.73E−11 | 6.15E−14 | −3.37E−17 |
| 10 | −1.32E−06 | 1.02E−08 | −3.73E−11 | 6.15E−14 | −3.37E−17 |
| 11 | −3.36E−05 | 1.23E−06 | −1.04E−08 | 3.58E−11 | −4.50E−14 |

The eyepiece optical system of the second exemplary embodiment can observe all angles of view in a state in which the observer is observing the front as illustrated in FIG. 8. However, if eyeballs are rotated as illustrated in FIG. 9, a proportion at which a light beam with a diagonal display angle-of-view of 78° is guided to the exit pupil due to vinetting of the optical system is 10%. In this case, a proportion at which a light flux with a display angle-of-view of 60° is guided to the exit pupil is 100%, and a proportion at which a light flux with a display angle-of-view of 70° is guided to the exit pupil is 60%.

The amount of light at the angle of view in the peripheral portion decreases due to large vinetting of the optical system as described above, but optical performance at other angles of view can be improved and a thickness of the optical system can be reduced. In addition, in the case of an eyepiece optical system with a wide angle of view as in the second exemplary embodiment, when the peripheral portion is observed, a direction of a face tends to be changed instead of the eyeballs being rotated to observe the peripheral portion. Accordingly, the decrease in the amount of light in the peripheral portion is not noticeable.

In the case where the eye relief is long, the focal length is small, and the thickness is small as in the eyepiece optical system of the second exemplary embodiment, the emission angle from the image display element at the peripheral angle of view becomes large. And in the case where the emission angle from the image display element is large, the field-of-view angle characteristics deteriorate and an image with correct color cannot be observed. Further, an incidence angle of the polarization element of the polarization plate or the λ/4 plate in the eyepiece optical system increases, and polarization characteristics deteriorate, causing a reduced amount of light, uneven amount of light, uneven color, and the like. Therefore, it is preferable for the emission angle from the image display element at the peripheral angle of view to be small, and in the eyepiece optical system of the second exemplary embodiment, an emission angle of a main ray at a maximum peripheral view angle from the image display element is 60°. The eye relief E2 of the eyepiece optical system of the second exemplary embodiment is 18 mm and a maximum half angle of view θ2 is 39°. In this case, E2×tan θ2=14.6 mm.

Figure 10:
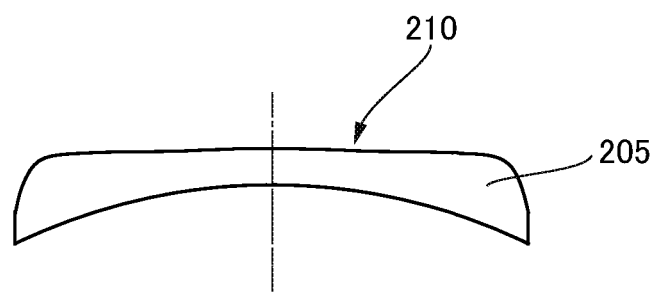
FIG. 10 is a cross-sectional view of a lens 205 in a plane including an optical axis.

In the second exemplary embodiment, an aspherical shape of the lens 205 on the image display element side is a shape as illustrated in FIG. 10, in order to reduce the emission angle from the image display element at a peripheral angle of view. FIG. 10 is a sectional view of the lens 205 in a plane in an optical axis direction including an optical axis. The lens 205 is a lens for determining the emission angle of the right-eye image display element 208. The lens 205 is disposed at a position closest to the right-eye image display element 208 among at least one lens included in the right-eye eyepiece optical system.

A surface of the lens 205 on the right-eye image display element 208 side is convex toward the right-eye image display element 208 in a region including the optical axis, but has curvature that becomes gentle as a distance from the optical axis increases, and has an inflection point 210 in an optically effective region. In the second exemplary embodiment, the focal length of the eyepiece optical system is shortened by setting the region including the optical axis to a convex shape. By making the curvature gentler as the distance from the optical axis increases, the emission angle from the image display element in the peripheral portion can be reduced. The same applies to the lens 207 that is a lens corresponding to the lens 205 in the left-eye eyepiece optical system.

It is possible to achieve the eyepiece optical system with a wide angle of view in which a focal length is small due to such an aspherical shape, and it is possible to suppress deterioration of the field-of-view angle characteristics of the image display element and reduce color aberration by reducing the emission angle from the image display element at the peripheral angle of view. Further, it is possible to reduce image quality deterioration such as a reduced amount of light, an uneven amount of light, and an uneven color by reducing the incidence angle of the polarization plate or the λ/4 plate.

The aspherical shape of the lens 205 on the image display element side has the inflection point 210 in order to achieve both the reduced emission angle from the image display element at the peripheral angle of view and the small focal length of the eyepiece optical system. A distance H2 of the inflection point 210 from the optical axis is about 5.5 mm, and a maximum distance R2 of the optically effective region of the surface of the lens 205 on the image display element side is 14 mm. Therefore, the distance from the optical axis to the inflection point 210 is at a position corresponding to 39% of the optically effective region.

Further, the aspherical shape of the lens 205 on the image display element side is a shape that varies monotonously as a distance from the optical axis increases, and has no maximum value or minimum value at points other than a point on the optical axis in the optically effective region. By doing so, both the reduced emission angle from the image display element at the peripheral angle of view and the small focal length of the eyepiece optical system are achieved. Further, it is possible to make it easy for the image to be observed or improve manufacturing accuracy of the aspheric shape by reducing the change in the aspheric shape to reduce the change in optical performance from a center to a periphery of the image.

Since the focal length F2 of the eyepiece optical system of the second exemplary embodiment is 13 mm and the focal length f2 at the time of reflection of the semi-transmissive reflective surface of the lens 204 is 22 mm, f2/F2 is 1.7.

The various numerical values of the eyepiece optical system according to the second exemplary embodiment described above can be summarized as shown in Table 6 below.

TABLE 6

| | |
|---|---|
| H2/R2 | 0.39 |
| L2/E2 | 0.8 |
| E2 × tan θ2 | 14.6 |
| E2 | 18 |
| f2/F2 | 1.7 |

The lenses of the second exemplary embodiment are resin lenses for weight reduction, but if the resin lens is manufactured by molding, birefringence occurs due to an influence of residual stress at the time of molding. In the case of an optical system using polarization as in the second exemplary embodiment, light use efficiency of a regular optical path described above is degraded due to the birefringence in the lens and a difference in light use efficiency between wavelengths also occurs. These cause a reduced amount of light, uneven amount of light, and uneven color of the observed image. Further, a proportion of light that is transmitted through the PBS due to an influence of the birefringence among light to be reflected by the PBS in the regular optical path increases, the light from the display element is directly guided to the eyes of the observer, and ghost light is generated. Therefore, it is necessary for the birefringence of the resin lens constituting the eyepiece optical system to be as small as possible.

The amount of birefringence on the optical axis of a material of the lens 204 in the right-eye eyepiece optical system and the lens 206 in the left-eye eyepiece optical system of the second exemplary embodiment is about 1 nm/mm, and the amount of birefringence on the optical axis of a material of the lens 205 in the right-eye eyepiece optical system and the lens 207 in the left-eye eyepiece optical system is about 6 nm/mm.

Since in the lens 204 and the lens 206, the optical path is folded and passes through the lens three times, the influence of the birefringence is tripled. Therefore, it is preferable for the amount of birefringence per unit length on an optical axis of a material of the lens 204 and the lens 206 to be smaller than the amount of birefringence per unit length on an optical axis of a material of the lens 205 and the lens 207. It is more preferable for the amount of birefringence on the optical axis of the lens 204 and the lens 206 to be smaller than the amount of birefringence on the optical axis of the lens 205 and the lens 207. Since the lens 204 and the lens 206 are thicker than the lenses 205 and 207, an influence of the birefringence is greater. If the amount of birefringence is small even if the lens is thick, the birefringence of the entire eyepiece optical system can be reduced.

As can be seen from Table 3 above, a refractive index of the lens 204 and the lens 206 is 1.544, and a refractive index of the lens 205 and the lens 207 is 1.635. It is preferable for a refractive index of the lens 205 and the lens 207 to be greater than that of the lenses 204 and 206 in order to cancel curvature of an image surface caused by the reflection on the semi-transmissive reflective surfaces of the lens 204 and the lens 206 using the lens 205 and the lens 207. By doing so, it is possible to observe an image with a small curvature of the image surface.

In the second exemplary embodiment, the lens 204 and the lens 205 of the right-eye eyepiece optical system and the lens 206 and the lens 207 of the left-eye eyepiece optical system are bonded to form an integrated bonded lens. With the bonded lens, it is easy for the lens to be held.

Further, a polarization plate may be disposed between the PBS and the eyeball of the observer in order to reduce unnecessary ghost light and increase contrast of the observed image.

In the second exemplary embodiment, surfaces of the lens 204 and the lens 206 on the eyeball side of the observer are flat surfaces. Accordingly, it is possible to achieve both long eye relief and an optical system with a small thickness.

Further, although the PBS 215 is formed on a flat surface portion of the lens 204, the surface of the lens 204 on the right eye 202 side of the observer may be formed as a curved surface and the PBS 215 may be formed on the curved surface. By doing so, a degree of freedom in designing the lens 204 is improved, and an eyepiece optical system with better optical performance is obtained.

Third Exemplary Embodiment

Figure 11:
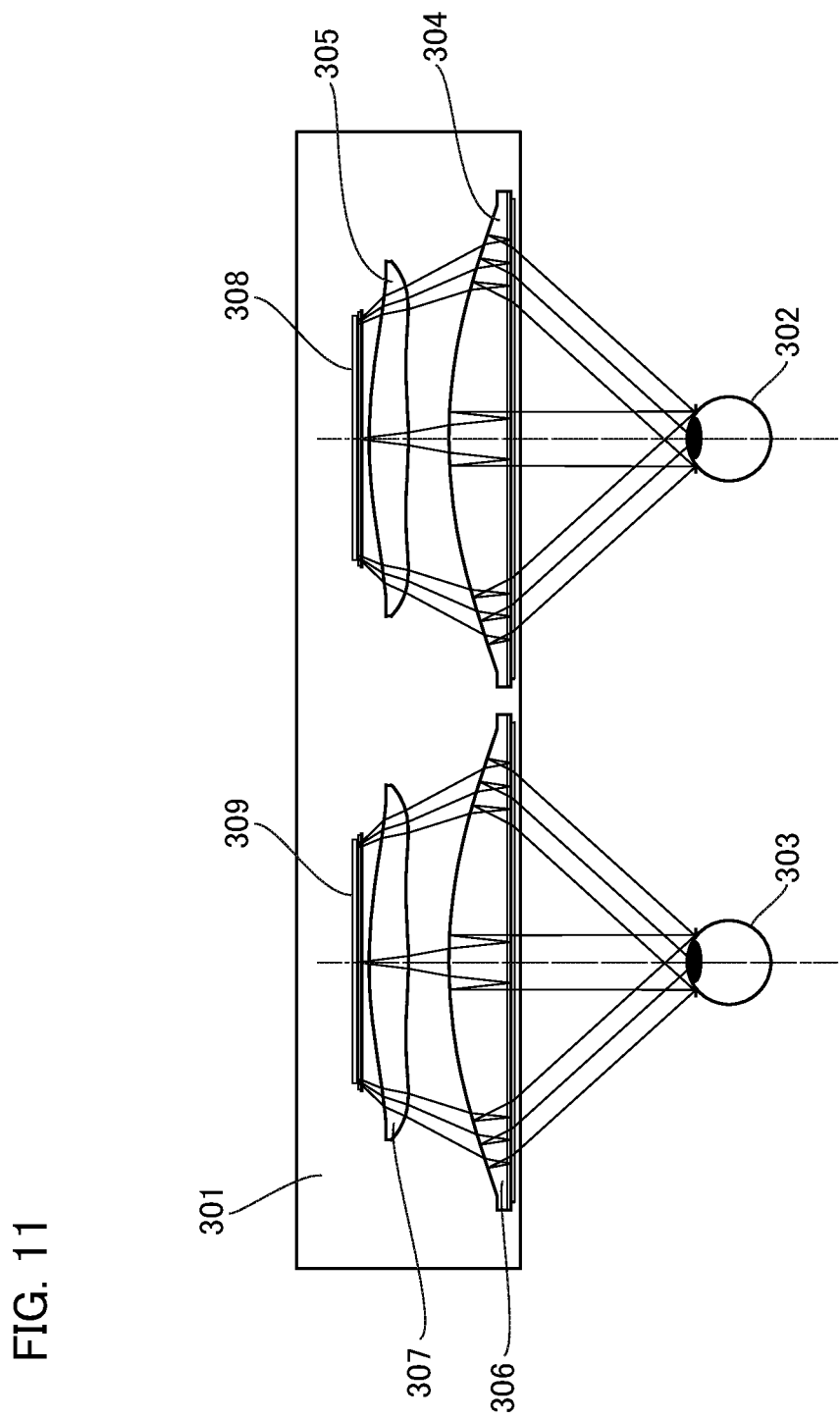
FIG. 11 is a schematic view of an image display device according to a third exemplary embodiment.

A configuration of an image display device according to a third exemplary embodiment will be described with reference to an eyepiece optical system of an image display device in FIG. 11. FIG. 11 is a schematic diagram of the image display device according to the third exemplary embodiment. In FIG. 11, 301 denotes an HMD, 302 denotes a right eye of an observer, and 303 denotes a left eye of the observer. A lens 304 and a lens 305 constitute a right-eye eyepiece optical system, and a lens 306 and a lens 307 constitute a left-eye eyepiece optical system. 308 indicates a right-eye image display element, 309 indicates a left-eye image display element, and the image display element are organic EL displays.

The right-eye eyepiece optical system magnifies and projects an original image displayed on the right-eye image display element 308 as a virtual image and guides the image to the right eye 302 of the observer. The left-eye eyepiece optical system magnifies and projects an original image displayed on the left-eye image display element 309 as a virtual image and guides the image to the left eye 303 of the observer. In the third exemplary embodiment, as an example, a focal length F3 of the right-eye eyepiece optical system and the left-eye eyepiece optical system is 16 mm, a horizontal display angle-of-view is 65°, a vertical display angle-of-view is 65°, a diagonal display angle-of-view is 84°, and eye relief E3 is 29 mm.

Figure 12:
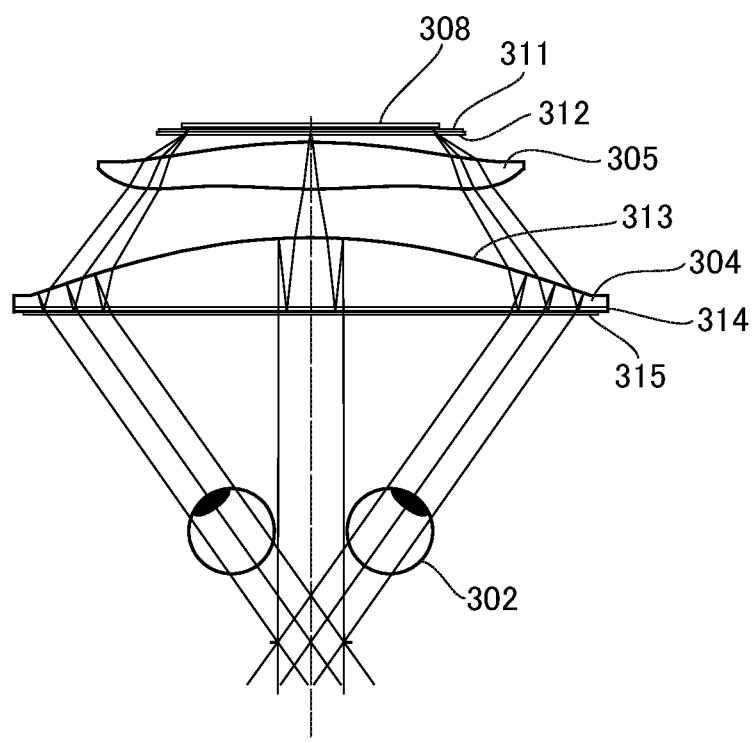
FIG. 12 is a diagram illustrating details of an eyepiece optical system according to the third exemplary embodiment.

The eyepiece optical system of the third exemplary embodiment is an optical system that includes a polarization element and folds an optical path using polarization. The optical path of the eyepiece optical system of the third exemplary embodiment in the right-eye eyepiece optical system will be described. FIG. 12 is a diagram illustrating details of the eyepiece optical system according to the third exemplary embodiment. The eyepiece optical system according to the third exemplary embodiment includes at least one lens. First, a polarization plate 311 and a λ/4 plate 312 are disposed in this order from the right-eye image display element 308 side between the right-eye image display element 308 and the lens 305, and a half mirror 313 is deposited on a surface of the lens 304 on the lens 305 side. The surface on which the half mirror 313 is deposited acts as a semi-transmissive reflective surface. Further, a λ/4 plate 314 and a PBS 315 of a reflective polarization plate are formed in this order from the right-eye image display element 308 side between the lens 304 and the right eye 302 of the observer.

In this case, a slow axis of the λ/4 plate 312 and a slow axis of the λ/4 plate 314 are orthogonal to each other. Therefore, if a polarization direction in transmission through the polarization plate 311 and the slow axis of the λ/4 plate 312 are tilted by 45°, a polarization direction in transmission through the polarization plate 311 and the slow axis of the λ/4 plate 314 are tilted by −45°. Further, the polarization direction in transmission in the polarization plate 311 is orthogonal to a polarization direction in transmission through the PBS 315.

In the case of such a configuration, light emitted from the right-eye image display element 308 is transmitted through the polarization plate 311 to become linearly polarized light, and is transmitted through the λ/4 plate 312 to become circularly polarized light. The circularly polarized light is transmitted through the half mirror 313 and the λ/4 plate 314 to become linearly polarized light. Since a polarization direction of the linearly polarized light is orthogonal to the polarization direction in transmission through the PBS 315, the light is reflected by the PBS 315 and transmitted through the λ/4 plate 314 to become circularly polarized light. The light is reflected by the half mirror 313 and transmitted through the λ/4 plate 314 to become linearly polarized light, but a polarization direction of this linearly polarized light is different from a previous one and matches the polarization direction in transmission through the PBS 315. Accordingly, the linearly polarized light is transmitted through the PBS 315 and guided to the right eye 302 of the observer. The same optical path applies to the left-eye eyepiece optical system.

With the optical system that folds the optical path using polarization as in the third exemplary embodiment, the thickness of the eyepiece optical system can be reduced, the focal length of the eyepiece optical system can be shortened, and wide angle-of-view image observation can be realized.

Since the HMD is a head-mounted image display device, it is preferable for the HMD to be lightweight. Therefore, it is preferable for the lenses constituting the eyepiece optical system to be made of a resin having a specific gravity smaller than that of glass, and the lenses 304, 305, 306, and 307 of the third exemplary embodiment are resin lenses and are aspherical lenses to enhance an aberration correction effect.

As illustrated in FIG. 12, the exit pupil of the eyepiece optical system of the third exemplary embodiment is at a position of 30 mm, which is eye relief of 20 mm plus a rotation radius of an eyeball of 10 mm, and an exit pupil diameter is 6 mm.

In a case where a thickness L3 of the right-eye eyepiece optical system is defined as a distance from a surface of the PBS 315 on the right eye 302 of the observer between the lens 304 and the right eye 302 of the observer to a surface of the right-eye image display element 308 on the polarization plate 311 side, the thickness L3 is 17 mm. Since the eye relief E3 is 20 mm as described above, a ratio L3/E3 between the thickness L3 and the eye relief E3 is 0.9.

Optical data of the eyepiece optical system of the third exemplary embodiment is shown in Table 5. In the surface number, an exit pupil position is surface 1, and backward ray tracing, which is to form an image onto an image display element surface from a virtual image position, is shown as in the first exemplary embodiment.

TABLE 7

| SURF | d | R | typ | Nd | vd |
|---|---|---|---|---|---|
| Virtual image surface | −1400 | | | | |
| 1 | 10.00 | | | | |
| 2 | 20.00 | | | | |
| 3 | 0.25 | ∞ | SPH | 1.516 | 64.1 |
| 4 | 0.25 | ∞ | SPH | 1.516 | 64.1 |
| 5 | 6.56 | ∞ | SPH | 1.487 | 70.4 |
| 6 | −6.56 | −55.17649 | ASP2 | 1.487 | 70.4 |
| 7 | −0.25 | ∞ | SPH | 1.516 | 64.1 |
| 8 | 0.25 | ∞ | SPH | 1.516 | 64.1 |
| 9 | 6.56 | ∞ | SPH | 1.487 | 70.4 |
| 10 | 4.45 | −55.17649 | ASP2 | | |
| 11 | 4.29 | 53.219166 | ASP2 | 1.516 | 64.1 |
| 12 | 0.70 | −55.94 | ASP2 | | |
| 13 | 0.25 | ∞ | SPH | 1.516 | 64.1 |
| 14 | 0.25 | ∞ | SPH | 1.516 | 64.1 |
| 15 | 0.10 | ∞ | SPH | | |
| Image display element surface | | | | | |

Aspheric coefficients A to E of surface numbers 6, 10, 11, and 12 are as shown in Table 6.

TABLE 8

| SURF | A | B | C | D | E |
|---|---|---|---|---|---|
| 6 | 8.23E−70 | 2.70E−09 | −4.37E−13 | −2.45E−15 | 2.51E−18 |
| 10 | 8.23E−70 | 2.70E−09 | −4.37E−13 | −2.45E−15 | 2.51E−18 |
| 11 | −9.98E−05 | 2.83E−07 | −7.52E−11 | −2.35E−13 | 2.24E−16 |
| 12 | 3.62E−06 | 2.16E−08 | 2.98E−11 | −1.93E−14 | −2.48E−16 |

The eyepiece optical system of the third exemplary embodiment can observe all angles of view in a state in which the observer is observing the front as illustrated in FIG. 11. However, if eyeballs are rotated as illustrated in FIG. 12, a proportion at which a light beam with a diagonal display angle-of-view of 84° is guided to the exit pupil due to vignetting of the optical system is 20%. In this case, a proportion at which a light flux with a display angle-of-view of 65° is guided to the exit pupil is 100%, and a proportion at which a light flux with a display angle-of-view of 75° is guided to the exit pupil is 70%.

The amount of light at the angle of view in the peripheral portion decreases due to large vinetting of the optical system as described above, but optical performance at other angles of view can be improved and a thickness of the optical system can be reduced. In addition, in the case of an eyepiece optical system with a wide angle of view as in the second exemplary embodiment, when the peripheral portion is observed, a direction of a face tends to be changed instead of the eyeballs being rotated to observe the peripheral portion. Accordingly, the decrease in the amount of light in the peripheral portion is not noticeable.

In a case where the eye relief is long, the focal length is small, and the thickness is small as in the eyepiece optical system of the exemplary embodiment, the emission angle from the image display element at the peripheral angle of view becomes large. And in a case where the emission angle from the image display element is large, the field-of-view angle characteristics deteriorate and an image with correct color cannot be observed. Further, an incidence angle of the polarization element of the polarization plate or the λ/4 plate in the eyepiece optical system increases, and polarization characteristics deteriorate, causing a reduced amount of light, uneven amount of light, uneven color, and the like. Therefore, it is preferable for the emission angle from the image display element at the peripheral angle of view to be small, and in the eyepiece optical system of the exemplary embodiment, an emission angle of a main ray at a maximum peripheral view angle from the image display element is 60°.

The eye relief E3 of the eyepiece optical system of the third exemplary embodiment is 20 mm, and a maximum half angle of view θ3 is 42°. In this case, E3×tan θ3=18 mm.

Figure 13:
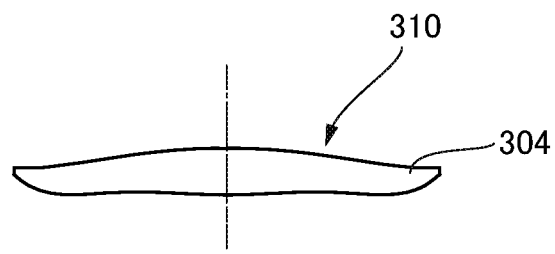
FIG. 13 is a cross-sectional view of a lens 304 in a plane including an optical axis.

In the exemplary embodiment, an aspherical shape of the lens 305 on the image display element side is a shape as illustrated in FIG. 13, in order to reduce the emission angle from the image display element at a peripheral angle of view. FIG. 13 is a sectional view of the lens 305 in a plane in an optical axis direction including an optical axis. The lens 305 is a lens for determining the emission angle of the right-eye image display element 308. The lens 305 is disposed at a position closest to the right-eye image display element 308 among at least one lens included in the right-eye eyepiece optical system.

A surface of the lens 305 on the right-eye image display element 308 side is convex toward the right-eye image display element 308 in a region including the optical axis, but has curvature that becomes gentle as a distance from the optical axis increases, and has an inflection point 310 in an optically effective region. The focal length of the eyepiece optical system is shortened by setting the region including the optical axis to a convex shape. By making the curvature gentler as the distance from the optical axis increases, the emission angle from the image display element in the peripheral portion can be reduced. The same applies to the lens 307 that is a lens corresponding to the lens 305 in the left-eye eyepiece optical system.

It is possible to achieve the eyepiece optical system with a wide angle of view in which a focal length is small due to such an aspherical shape, and it is possible to suppress deterioration of the field-of-view angle characteristics of the image display element and reduce color aberration by reducing the emission angle from the image display element at the peripheral angle of view. Further, it is possible to reduce image quality deterioration such as a reduced amount of light, an uneven amount of light, and an uneven color by reducing the incidence angle of the polarization plate or the λ/4 plate.

The aspherical shape of the lens 305 on the image display element side has the inflection point 310 in order to achieve both the reduced emission angle from the image display element at the peripheral angle of view and the small focal length of the eyepiece optical system. A distance H3 of the inflection point 310 from the optical axis is about 11 mm, and a maximum distance R3 of the optically effective region of the surface of the lens 305 on the image display element side is 17 mm. Therefore, the distance from the optical axis to the inflection point 310 is at a position corresponding to 65% of the optically effective region.

Further, the aspherical shape of the lens 305 on the image display element side is a shape that varies monotonously as a distance from the optical axis increases, and has no maximum value or minimum value at points other than a point on the optical axis in the optically effective region. By doing so, both the reduced emission angle from the image display element at the peripheral angle of view and the small focal length of the eyepiece optical system are achieved. Further, it is possible to make it easy for the image to be observed or improve manufacturing accuracy of the aspheric shape by reducing the change in the aspheric shape to reduce the change in optical performance from a center to a periphery of the image.

Since the focal length F3 of the eyepiece optical system of the exemplary embodiment is 16 mm and the focal length f3 at the time of reflection of the semi-transmissive reflective surface of the lens 304 is 28 mm, f3/F3 is 1.7.

The various numerical values of the eyepiece optical system according to the exemplary embodiment described above can be summarized as shown in Table 9 below.

TABLE 9

| H3/R3 | 0.65 |
|---|---|
| L3/E3 | 0.9 |
| E3 × tan θ3 | 18 |
| E3 | 20 |
| F3/F3 | 1.7 |

The lenses of the third exemplary embodiment are resin lenses for weight reduction, but if the resin lens is manufactured by molding, birefringence occurs due to an influence of residual stress at the time of molding. In the case of an optical system using polarization as in the third exemplary embodiment, light use efficiency of a regular optical path described above is degraded due to the birefringence in the lens and a difference in light use efficiency between wavelengths also occurs. These cause a reduced amount of light, uneven amount of light, and uneven color of the observed image. Further, a proportion of light that is transmitted through the PBS due to an influence of the birefringence among light to be reflected by the PBS in the regular optical path increases, the light from the display element is directly guided to the eyes of the observer, and ghost light is generated. Therefore, it is necessary for the birefringence of the resin lens constituting the eyepiece optical system to be as small as possible.

In the lens 304 of the right-eye eyepiece optical system and the lens 306 of the left-eye eyepiece optical system of the third exemplary embodiment, influence of birefringence is tripled since the optical path is folded and passes through the lens three times. Therefore, it is preferable for the amount of birefringence per unit length on an optical axis of a material of the lens 304 and the lens 306 to be smaller than the amount of birefringence per unit length on an optical axis of a material of the lens 305 and the lens 307. It is more preferable for the amount of birefringence on the optical axis of the lens 304 and the lens 306 to be smaller than the amount of birefringence on the optical axis of the lens 305 and the lens 307. Since the lens 304 and the lens 306 are thicker than the lens 305 and the lens 307, the influence of birefringence is larger. If the amount of birefringence is small even if the lens is thick, the birefringence of the entire eyepiece optical system can be reduced.

As can be seen from Table 5 above, a refractive index of the lens 304 and the lens 306 is 1.487, and a refractive index of the lens 305 and the lens 307 is 1.516. It is preferable for a refractive index of the lens 305 and the lens 307 to be greater than that of the lenses 304 and 306 in order to cancel curvature of an image surface caused by the reflection on the semi-transmissive reflective surfaces of the lens 304 and the lens 306 using the lens 305 and the lens 307. By doing so, it is possible to observe an image with a small curvature of the image surface.

Further, a polarization plate may be disposed between the PBS and the eyeball of the observer in order to reduce unnecessary ghost light and increase contrast of the observed image.

In the third exemplary embodiment, surfaces of the lens 304 and the lens 306 on the eyeball side of the observer are flat surfaces. Accordingly, it is possible to achieve both long eye relief and an optical system with a small thickness.

Further, although the PBS 315 is formed on a flat surface portion of the lens 304, the surface of the lens 304 on the right eye 302 side of the observer may be formed as a curved surface and the PBS 315 may be formed on the curved surface. By doing so, a degree of freedom in designing the lens 304 is improved, and an eyepiece optical system with better optical performance is obtained.

In the third exemplary embodiment, the polarization plate 311 and the λ/4 plate 312 on the image display element side are disposed between the lens 305 and the right-eye image display element 308, thereby reducing a size of the polarization plate 311 and the λ/4 plate 312 to reduce costs. The polarization plate 311 and the λ/4 plate 312 may be disposed between the lens 304 and the lens 305. In this case, a configuration not influenced by the birefringence of the lens 305 is adopted such that a reduced amount of light, uneven amount of light, and uneven color of the observed image, or ghost light can be reduced.

While the present invention has been described with reference to exemplary embodiments, it is to understood that the invention is not limited to the disclosed exemplary embodiments. The scope of the following claims is to be accorded the broadest interpretation in order to encompass all such modifications and equivalent structures and functions.

This application claims the benefit of Japanese Patent Application No. 2018-234302, filed on Dec. 14, 2018, which is hereby incorporated by reference herein in its consist.

What is claimed is:

1. An eyepiece optical system guiding light from an image display element toward an observer,
   wherein the eyepiece optical system includes a first wavelength plate, a second wavelength plate, a reflective polarization plate, and at least two lenses,
   wherein the at least two lenses includes a first lens disposed at a position closest to the image display element among the at least two lenses and a second lens having a semi-transmissive reflective surface,
   wherein a surface of the first lens on an image display element side has an aspherical shape having a convex shape toward the image display element side in a region including an optical axis,
   wherein the aspherical shape has an inflection point within an optically effective region in a cross section including the optical axis, and
   wherein an eye relief E of the eyepiece optical system satisfies $15 \text{ mm} \leq E \leq 25 \text{ mm}$.

2. The image display device eyepiece optical system according to claim 1, wherein a distance H between the inflection point and the optical axis satisfies $0.2 \leq H/R \leq 0.7$ with respect to a maximum distance R from the optical axis of the optically effective region.

3. The eyepiece optical system according to claim 1, wherein a thickness L in an optical axis direction of the eyepiece optical system and the eye relief E of the eyepiece optical system satisfy $0.6 \leq L/E \leq 1.3$.

4. The eyepiece optical system according to claim 1, wherein the aspherical shape varies monotonously as a distance from the optical axis.

5. The eyepiece optical system according to claim 1, wherein the first lens is a resin lens.

6. The eyepiece optical system according to claim 1, wherein the first wavelength plate and the second wavelength plate are $\lambda/4$ plates, and the reflective polarization plate is configured to reflect first linearly polarized light and transmit second linearly polarized light of which polarization direction is orthogonal to the first linearly polarized light.

7. The eyepiece optical system according to claim 6, wherein an angle formed between a slow axis of the first wavelength plate and a direction of polarization of the first linearly polarized light is 45°, and an angle formed between a slow axis of the second wavelength plate and the direction of polarization of the first linearly polarized light is −45°.

8. The eyepiece optical system according to claim 6, wherein the eyepiece optical system includes a polarization plate configured to transmit the second linearly polarized light, wherein the polarization plate is arranged between the reflective polarization plate and the observer.

9. The eyepiece optical system according to claim 6, wherein the eyepiece optical system includes a polarization plate configured to transmit the first linearly polarized light wherein the polarization plate is arranged between the image display element and the first wavelength plate.

10. The eyepiece optical system according to claim 1, wherein a focal length F of the entire eyepiece optical system and a focal length f of the semi-transmissive reflective surface satisfy $1.6 \leq f/F \leq 1.9$.

11. The eyepiece optical system according to claim 1, wherein an amount of birefringence per unit length on an optical axis of the second lens is smaller than an amount of birefringence per unit length on an optical axis of the first lens.

12. The eyepiece optical system according to claim 1, wherein an amount of birefringence on an optical axis of the second lens is smaller than an amount of birefringence on an optical axis of the first lens.

13. The eyepiece optical system according to claim 1, wherein a refractive index of the second lens is smaller than a refractive index of the first lens.

14. The eyepiece optical system according to claim 1, wherein the semi-transmissive reflective surface has an aspherical shape.

15. The eyepiece optical system according to claim 1, wherein the first lens and the second lens is bonded.

16. The eyepiece optical system according to claim 1, wherein the second lens on an observer side has a flat surface and the second lens on the image display element side has the semi-transmissive reflective surface.

17. An image display device including an eyepiece optical system according to claim 1, and the image display element.

18. The image display device according to claim 17, wherein an eye relief E of the eyepiece optical system and a maximum half angle of view $\theta$ of the eyepiece optical system satisfy $8 \text{ mm} \leq E \times \tan \theta \leq 20 \text{ mm}$.

* * * * *